United States Patent

[11] 3,609,396

[72] Inventor Gerhard Günter Gassmann,
  Berkheim, Germany
[21] Appl. No. 816,285
[22] Filed Apr. 15, 1969
[45] Patented Sept. 28, 1971
[73] Assignee International Standard Electric
  Corporation
  New York, N.Y.
[32] Priority Apr. 27, 1968
[33] Germany
[31] P 17 62 197.5

[54] PULSE-SELECTING CIRCUIT
  2 Claims, 12 Drawing Figs.
[52] U.S. Cl. .................................................. 307/234,
  307/233, 307/300
[51] Int. Cl. .................................................. H03k 5/20
[50] Field of Search ........................................... 307/233,
  234, 300, 235

[56] References Cited
  UNITED STATES PATENTS
3,006,996 10/1961 Isabeau ..................... 307/234 X
3,050,640 8/1962 Dillingham et al. .......... 307/300 X
3,248,564 4/1966 Rees .......................... 307/300 X Primary Examiner—Donald D. Forrer
Assistant Examiner—R. C. Woodbridge
Attorneys—C. Cornell Remsen, Jr., Walter J. Baum, Paul W. Hemminger, Percy P. Lantzy, Philip M. Bolton, Isidore Togut and Charles L. Johnson, Jr.

ABSTRACT: Pulses of different duration or frequency are coupled to the input of two series-connected transistors each having a different nonconducting delay time. The output pulses having a duration or frequency within a predetermined range of duration or frequency are removed from the second transistor. The nonconducting delay time of the second transistor is greater than the period of the pulses to be selected and the nonconducting delay time of the first transistor is shorter than the duration of the pulses to be selected.

INVENTOR
GERHARD-GÜNTER GASSMANN

BY  *Alfred C. Hill*

AGENT

IN THE CASE OF $t_E = t_1$

IN THE CASE OF $t_E = t_2$

IN THE CASE OF $t_E = t_3$

INVENTOR

GERHARD-GÜNTER GASSMANN

BY Alfred C. Hill

AGENT

PULSE-SELECTING CIRCUIT

BACKGROUND OF THE INVENTION

This invention relates to a circuit for the selection of pulses having a duration in a predetermined range $t_E = t_0...(t_0+\Delta t)$, or a frequency in a predetermined range $f_0...(f_0+\Delta f)$.

SUMMARY OF THE INVENTION

It is an object of the invention to provide a circuit which selects pulses of a duration or frequency in a predetermined range from pulses of any duration or frequency. Circuits of this kind are valuable, for example, in telecontrol engineering and telemetering. In addition, they are useful for demodulating pulse-width-modulated signals. Finally, the circuit may also be used for selecting pulses in a certain frequency range from pulses of any frequency. In such a case the circuit may also be used for the demodulation of frequency-modulated pulses.

A feature of this invention is the provision of a circuit for selecting pulses having a given characteristic in a predetermined range of the given characteristic comprising a first semiconductor device (diode or transistor) having a nonconducting delay (storage) time shorter than the pulse duration of the bottom limit of the predetermined range; a second semiconductor device (diode or transistor) having a maximum nonconducting delay time greater than the duration of the period of the pulses in the predetermined range coupled in series with the first device; the delayed slope of the output pulse of the first device achieving in a given time equal to the width of the predetermined range an amplitude at which the nonconducting delay time of the second device is equal to the period; a pulse input coupled to the input of the first device; and a pulse output coupled to the output of said second device.

The circuit of the invention has the advantage that a relatively high degree of selection of pulses may be achieved, both in respect to their length or duration and, if pulses of different frequencies are to be sorted, in respect to their frequency. It also has the very important advantage that neither coils nor capacitors are used, so that it is particularly valuable for integrated techniques. In addition it has the advantage that the predetermined range of pulse lengths or, if required, the predetermined range of frequencies can be varied without additional means by the use of a regulating or bias voltage supplied externally.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENT

Figure 1:
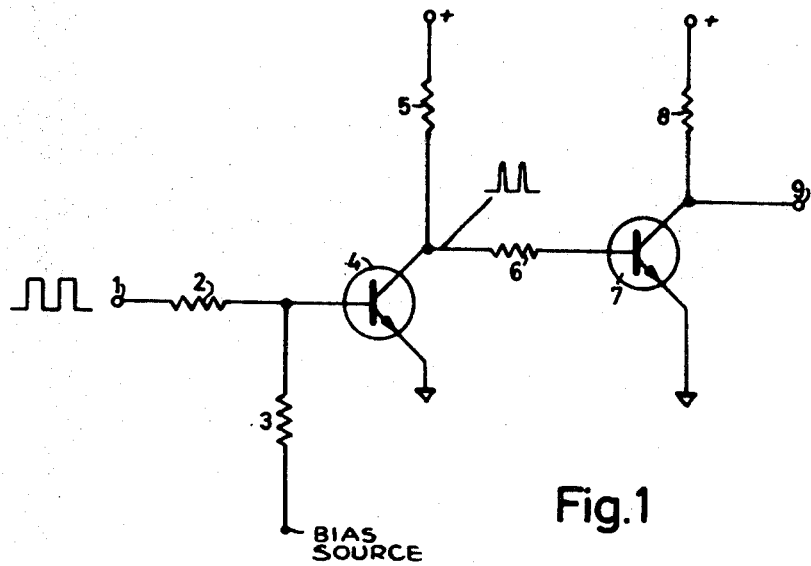
FIG. 1 is a schematic diagram of a circuit in accordance with the principles of the present invention.

In FIG. 1, the pulses to be selected are applied to the input terminal 1. 2 is a series resistor. 3 is a leak resistor to which a biassing potential is applied to vary the predetermined range of durations or frequency by changing the nonconducting delay (storage) time of the first semiconductor device illustrated to be transistor 4. 5 is the collector resistor of transistor 4. 6 is a coupling resistor leading from the collector of the first transistor to the base of the second semiconductor device, illustrated to be transistor 7. 8 is the collector resistor of transistor 7. Terminal 9 is the output terminal.

Figure 2A:
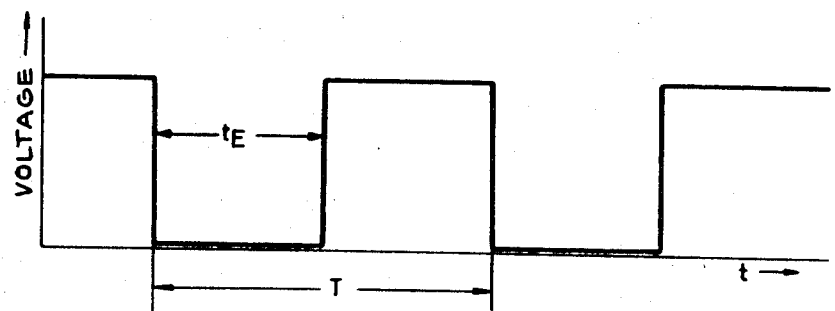
FIGS. 2, 3 and 4 are graphs illustrating the operation of the circuit of FIG. 1.

In FIG. 2a, the pulses to be selected fed to the input terminal 1 are represented, T being the length of the period of these pulses and $t_E$ the duration of the negatively directed pulses in this case.

Figure 2B:
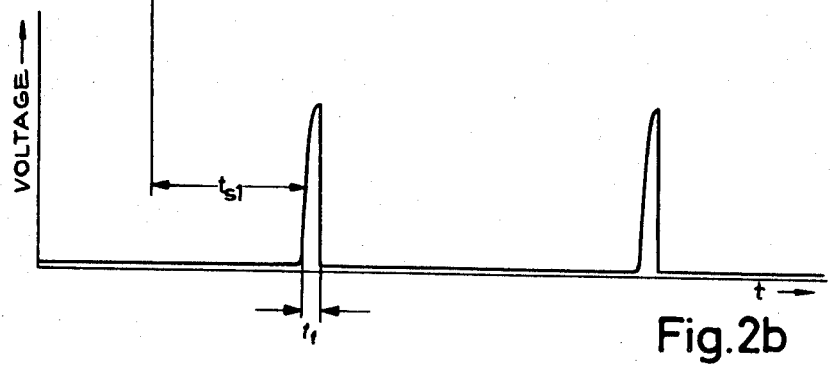

FIG. 2b shows the positive pulses which appear at the collector of the first transistor 4. $t_{s1}$ represents the nonconducting delay time of transistor 4 and $t_f$ is the "decay" time, that is, the time in which the collector current drops to zero, or, in other words, the time in which the collector voltage reaches its maximum. It will be seen from FIGS. 2 that the needle-shaped pulses will disappear completely when the time $t_E$ is equal to, or shorter than the time $t_{s1}$. Due to the finite duration of the decay time $t_f$, the needle-shaped pulses of FIG. 2b do not disappear suddenly on shortening the time $t_E$, but the amplitude of the needle pulse of FIG. 2b changes in the transition region. This is illustrated in detail in FIGS. 3.

Figure 3A:
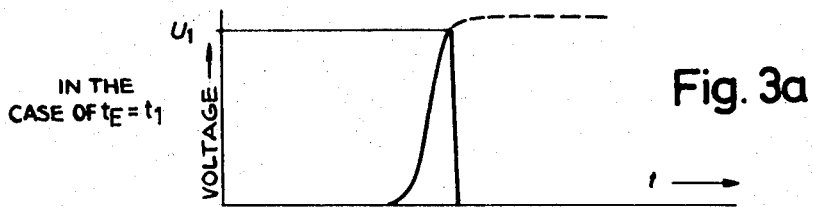
Figure 3B:
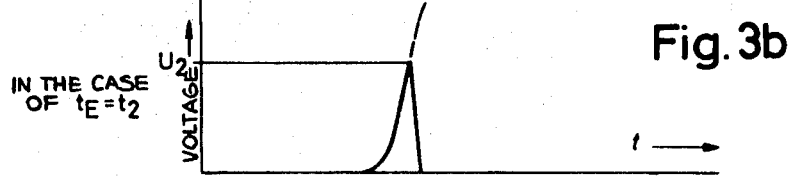
Figure 3C:
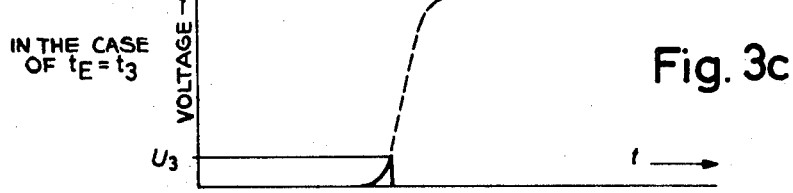
Figure 3D:
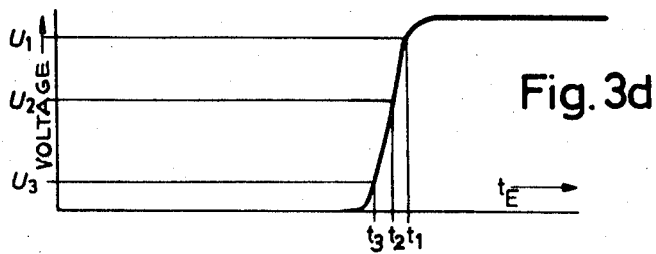
Figure 4A:
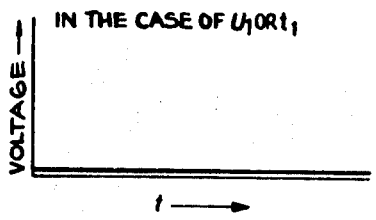
Figure 4B:
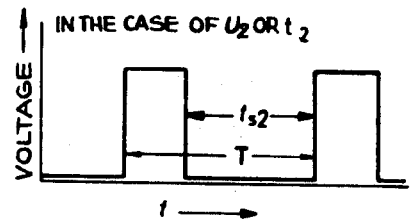
Figure 4C:
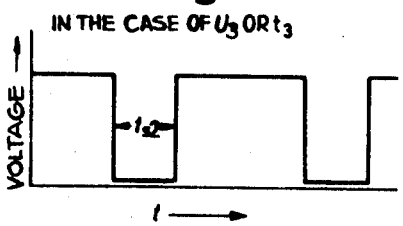
Figure 4D:
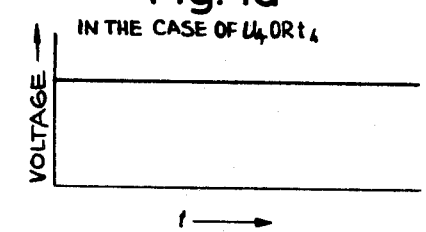
Figure 4E:
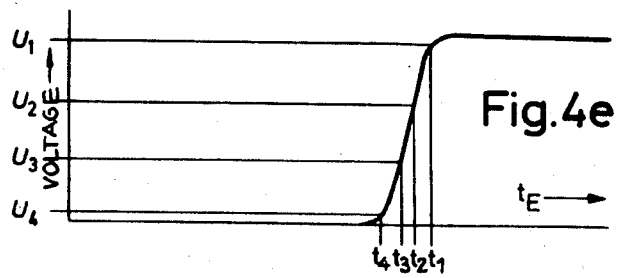

In FIGS. 3a to 3c the needle-shaped pulses are shown greatly expanded. FIG. 3a shows the needle pulse when $t_E = t_1$, in which case it has approximately its full amplitude. FIG. 3b shows the needle pulse when $t_E = t_2$ and FIG. 3c shows the needle pulse when $t_E = t_3$. FIG. 3d is a graph in which the changing amplitude of the needle pulses is plotted against $t_E$. The potentials $U_1$, $U_2$ and $U_3$ are the peak values of the needle pulses at $t_1$, $t_2$ and $t_3$, respectively. These needle pulses, which, as is seen from FIG. 3d, have a steep amplitude gradient against the time $t_E$ in the range $T_1$ to $t_3$, are applied to the second transistor 7 having the nonconducting delay time $t_{s2}$, which at full amplitude of the needle-shaped pulses is substantially longer than the length T of the period of the pulses.

FIGS. 4 illustrate the mode of operation of this second transistor. For the sake of simplicity of illustration, it is assumed in FIGS. 4 that the nonconducting delay time $t_{s2}$ is only insignificantly longer than the period T. The operation of the second transistor makes use of the fact that the nonconducting delay time $t_{s2}$ is dependent on the amplitude of the needle pulses applied to this transistor. When the needle pulses have an amplitude $U_1$, as occurs when the pulse length $t_E = t_1$, the nonconducting delay time $t_{s2}$ is longer than the period length with the result that this stage will be continuously conducting and output terminal 9 will show a constant potential of approximately zero volts, as illustrated in FIG. 4a. When the pulse length $t_E = t_2$, the needle pulses have an amplitude of only $U_2$. In this case the nonconducting delay time $t_{s2}$ is noticeably shorter than the period T, as shown in FIG. 4b. At a pulse length of $t_3$, the amplitude of the needle pulses is $U_3$ and the nonconducting delay time $t_{s2}$ is reduced further (see FIG. 4c). At a pulse length of $t_4$ the amplitude $U_4$ of the needle pulses become very small (see FIG. 4d) such that the second transistor is no longer conducting at any time and no pulses appear at output terminal 9. Instead, there appears at terminal 9 a direct-current voltage corresponding to the supply voltage. As may be seen in FIGS. 4a to 4d, output pulses appear at the output terminal only in a relatively small range of $t_E$, while the average time value of the output pulses varies greatly with $t_E$. Since the nonconducting delay time $t_{s2}$ is advantageously selected such that it is substantially longer than the period T, the passband $\Delta t$ is substantially narrower than the range $t_1$ to $t_4$, which is approximately equal to the decay time $t_f$. In other words, the width of the passband $\Delta t$ is not only dependent on the decay time $t_f$, but also to a very substantial extent on the maximum nonconducting delay time of transistor 7. On the other hand, the position of the passband in the frequency spectrum is determined by the nonconducting delay time $t_{s1}$ of the first transistor 4.

The above is a description of the mode of operation of the circuit as regards the selection of pulses whose duration lies in a predetermined range $t_E = t_0...(t_0+\Delta t)$. The circuit may also be used for demodulating pulse-width-modulated signals, since over a relatively large range within the passband the average time value of the output pulses depends on the pulse width $t_E$, as may be seen from FIGS. 4b and 4c. The circuit of the invention may also be used for selecting pulses of a predetermined frequency range from pulses of any frequency. To achieve this, it is desirable to make the time $t_E$ linearly dependent on the period T. This may be achieved by using completely symmetrical pulses, for example, where the time $t_E$ is equal to T/2 or by using pulses where the pulse spacing $(T-t_E)$ is constant.

In the latter case $t_E$ is still in linear relationship to T, but no longer proportional to T. Thus, the circuit operates as a bandpass for pulse-shaped signals within a frequency range of $f_o...(f_o+\Delta f)$. Finally, the circuit may also serve as a frequency discriminator, provided that the linear relationship between $t_E$ and T mentioned above holds.

While I have described above the principles of my invention in connection with specific apparatus, it is to be clearly understood that the description is made only by way of example and not as a limitation to the scope of my invention as set forth in the objects thereof and in the accompanying claims.

I claim:

1. A circuit for selecting from an input-pulse train pulses having a given repetition period T and pulse durations in the range of $t_0$ to $(t_0+\Delta t)$, where $t_0$ is equal to the smallest of said pulse durations in said range, $(t_0+\Delta t)$ is equal to the largest of said pulse durations in said range and $\Delta t$ is equal to the change of said pulse durations in said range comprising:

a source of said input pulse trains;
a reference potential;
a power supply having a given value of voltage;
a first transistor having a base electrode coupled to said source, a collector electrode and an emitter electrode coupled to said reference potential;
a first load resistor coupled between said collector electrode of said first transistor and said power supply;
a bias source coupled to said base electrode of said first transistor to provide said first transistor with a nonconducting delay time equal to or less than $t_0$;
said first transistor providing output pulses having an amplitude varying from a maximum amplitude U1 for an input pulse duration equal to $(t_0+\Delta t)$ to a minimum amplitude U4 for an input pulse duration equal to $t_0$;
a second transistor having a base electrode coupled to said collector electrode of said first transistor, a collector electrode, and an emitter electrode coupled to said reference potential;
a second load resistor coupled between said collector electrode of said second transistor and said power supply; and
a pulse output terminal coupled to said collector electrode of said second transistor;
said second transistor having a variable nonconducting delay time controlled by and proportional to the amplitude of said output pulses from said first transistor, said nonconducting delay time of said second transistor being greater than T when the amplitude of said output pulses from said first transistor are equal to U1 and provides a substantially zero pulse output at said pulse output terminal said nonconducting delay time of said second transistor being much less than T when the amplitude of said output pulses from said first transistor are equal to U4 and provides a pulse output at said pulse-output terminal having a value equal to said given value of voltage supplied by said power supply and said nonconducting delay time of said second transistor varying between a value of T to a value much less than T when the amplitude of said output pulses from said first transistor varies from an amplitude of U1 to an amplitude of U4 and provides pulse outputs at said pulse output terminal having durations varying directly proportional to said nonconducting delay time of said second transistor.

2. A circuit according to claim 1, wherein
said bias source is variable to adjust said nonconducting delay time of said first transistor and, hence, the width of said range to which said circuit will respond.